United States Patent [19]

Rao

[11] Patent Number: 4,829,763
[45] Date of Patent: May 16, 1989

[54] PROCESS FOR PRODUCING POWER

[75] Inventor: Ashok D. Rao, Irvine, Calif.

[73] Assignee: Fluor Corporation, Irvine, Calif.

[21] Appl. No.: 119,031

[22] Filed: Nov. 10, 1987

Related U.S. Application Data

[63] Continuation of Ser. No. 800,518, Nov. 21, 1985, abandoned, which is a continuation-in-part of Ser. No. 707,673, Mar. 4, 1985, abandoned, which is a continuation-in-part of Ser. No. 576,038, Feb. 1, 1984, abandoned.

[51] Int. Cl.$^4$ ............................................. F02G 3/00
[52] U.S. Cl. .................................. 60/39.05; 60/39.53; 60/39.56
[58] Field of Search ................ 60/39.02, 39.05, 39.53, 60/39.56, 39.59

[56] References Cited

U.S. PATENT DOCUMENTS

| | | | |
|---|---|---|---|
| 2,186,706 | 1/1940 | Martinka | 60/39.05 |
| 2,869,324 | 1/1959 | Foote | 60/39.59 |
| 3,335,565 | 8/1967 | Aguet | 60/39.59 |
| 3,461,667 | 8/1969 | Aguet | 60/39.05 |
| 3,657,879 | 4/1972 | Ewbank et al. | 60/39.05 |
| 3,731,485 | 5/1973 | Rudolph et al. | 60/39.53 |
| 4,448,018 | 5/1984 | Sayama et al. | 60/39.53 |
| 4,537,023 | 8/1985 | Nakamura et al. | 60/39.05 |

Primary Examiner—Louis J. Casaregola
Attorney, Agent, or Firm—Lyon & Lyon

[57] ABSTRACT

A process is disclosed for producing mechanical energy or electric power from chemical energy contained in a fuel, utilizing a combustion turbine. The compressed air which is used for combustion of the fuel to drive the turbine is humidified prior to combustion in a multistage countercurrent saturator to replace some or all of the thermal diluent air with water vapor. Humidification is effected with the water at a temperature below its boiling point at the operating pressure. The compressed air is cooled prior to humidification by passing in heat exchange relationship with the water used for humidification. Low level heat is rejected from the compressed air during intercooling and prior to humidification. This process provides a significant improvement in thermal efficiency, compared to combined cycle, steam injected cycle, intercooled regenerative cycle, and other air humidification based processes. Additionally, the entire steam cycle of a combined cycle process is eliminated, including the steam turbine generator, steam drums, surface condenser and cooling towers.

17 Claims, 4 Drawing Sheets

PROCESS FOR PRODUCING POWER

BACKGROUND OF THE INVENTION

This application is a continuation of co-pending application Ser. No. 800,518 filed Nov. 21, 1985, now abandoned which application is a continuation-in-part of Ser. No. 707,673 filed Mar. 4, 1985 now abandoned, which application is a continuation-in-part of Ser. No. 576,038, filed Feb. 1, 1984, now abandoned, all entitled "Process for Producing Power."

1. Field of the Invention

This invention relates to a process for producing mechanical energy or electric power in which a combustion turbine is used for conversion of the chemical energy in a fuel.

2. Description of Prior Art

When a working fluid is used in an engine to produce mechanical energy or electrical power from the chemical energy contained in a fuel, the working fluid is pressurized and, following combustion of the fuel, the energy thus released from the fuel is absorbed into the working fluid as heat. The working fluid with the absorbed energy is then expanded to produce mechanical energy which may in turn be used to drive a generator to produce electrical power. Unconverted energy is rejected in the exhaust in the form of heat, only a portion of which may be recovered and utilized. The efficiency of the engine is at a maximum when the temperature of the working fluid entering the expansion stage is also at a maximum.

In the case of combustion turbines, air compression is used for the pressurization step and direct combustion of the fuel into the compressed air is the energy addition step. Expansion in the turbine produces the mechanical energy and the unconverted heat is carried off by the turbine exhaust. The efficiency of the combustion turbine is a maximum when the combustion temperature itself is at a maximum, and this occurs when the fuel is burned in the presence of the pressurized air under stoichiometric conditions, i.e., enough air is present for complete combustion, but without any excess.

When fuel oil is burned with air under stoichiometric conditions, however, the resulting temperature is approximately 4000° F., which is in excess of the metallurgical limits of the turbine. As a result, it is necessary to utilize a large excess of air in the combustion step, which acts as a thermal diluent and reduces the temperature of the combustion products to approximately 2000° F. The necessity to use a large excess of air under pressure in turn creates a large parasitic load on the system, because compression of the air requires mechanical energy and thus reduces the net power produced from the system, as well as reducing the overall efficiency of the system.

Another disadvantage of existing combustion turbine cycles is that the pressurization step requires compression of air. Compression of a gas is very inefficient, since mechanical energy is required, which is the highest form of energy and degrades into thermal energy. The mechanical energy required for air compression can be reduced by utilizing interstage cooling, that is, by cooling the temperature of the compressed air between successive stages of a multiple stage compression process. However, from an overall cycle efficiency standpoint, interstage cooling can be utilized advantageously if the heat removed from the compressed air in the inter-cooler can be efficiently recovered and utilized. If the entire heat is simply rejected to the atmosphere, the overall cycle efficiency is actually decreased, since it results in the consumption of more fuel to compensate for the energy lost through the inter-cooler. Accordingly, rather than simply rejecting the heat, in commercial practice, the high compressor horsepower requirement has been tolerated while containing the heat in the compressed air stream.

Even in light of the foregoing limitations, it is very desirable to use a combination turbine engine, because it is able to operate at the highest temperature of engines that use a working fluid to convert chemical energy in a fuel to mechanical energy. However, due to the high exhaust temperature that is inherent to a combustion turbine engine, the efficiency of the cycle is limited, and as a result, the exhaust from the engine is used as the heat source to operate another engine such as a steam turbine to increase the overall efficiency of utilization of the fuel. Such a system is called a combined cycle system and is widely used in the industry. Another use for the energy contained in the combustion turbine exhaust is to raise superheated steam which is injected back into the combustor of the combustion turbine, see, e.g., U.S. Pat. No. 3,978,661. Yet another method is to preheat the air leaving the compressor against the engine exhaust and simultaneously use interstage cooling during compression (see *Kent's Mechanical Engineers Handbook*, 1950). These systems show higher overall efficiencies with respect to the utilization of the chemical energy contained in a fuel, but as will be explained subsequently herein, are inherently less efficient than the process of the present invention.

A combined cycle cannot take full advantage of air-compressor inter-cooling, because the temperature of the heat rejected in the air compressor inter-cooler is too low to be recovered for efficient use such as steam generation. A small portion of this heat may be recovered for boiler feed water preheating as described in Agnet, U.S. Pat. No. 3,335,565 but this results in more heat being rejected with the stock gases and results in little, if any, net increase in either heat recovery or cycle efficiency. Recently, direct water injection into the air stream as a means of inter-cooling has been proposed. However, there are two disadvantages with this. One is that the temperature of air leaving the inter-cooling step is limited by the dew point temperature of the saturated air. Also, by the direct injection of water into the air in the intercooler, the added water vapor which serves as a thermal diluent needs to be compressed in the successive stages after the inter-cooler, which precludes realizing the full advantage of water vapor substitution as a means of saving compression power.

Foote, in U.S. Pat. No. 2,869,324, describes evaporation of water into the compressed air after preheating both the air and the water. However, this means of evaporation requires a higher temperature level to achieve useful moisture loading of the air because the air and water leave the evaporator in equilibrium with each other. This method of water evaporation is less efficient than the present invention which can take advantage of air entering the saturator at low temperatures.

The steam cycle has an inherent high irreversibility since the evaporation of water (steam generation) occurs at a constant temperature, whereas the heat release occurs at varying temperatures.

With steam generation, a small temperature difference between the heat source and heat absorbing fluid cannot be maintained, and this leads to a high irreversibility in the system and hence a lower efficiency.

A combined cycle plant is also expensive since it requires an additional steam turbogenerator, steam drums, surface condenser for condensing steam turbine exhaust, and cooling towers to reject the heat from the surface condenser to the atmosphere.

A steam injected cycle cannot take full advantage of air-compressor inter-cooling for the same reasons as a combined cycle. Also this cycle involves the generation of steam and hence has the same irreversibility associated with it as described for a combined cycle, although eliminating the steam turbogenerator, surface condenser and cooling towers, and reducing the parasitic load of air compression by displacing some of the air with steam. This is an improvement over the water injected cycle described in NASA Report No. TR-981 titled "Theoretical Analysis of Various Thrust-Augumentation cycles for Turbojet Engines", by B. L. Lundin, 1950, where liquid water is directly injected into the combustor. The injected water displaces some of the diluent air, but there is a tremendous irreversibility associated with this. The evaporation of the liquid water in the combustor uses energy from the fuel at the highest temperature, which results in an overall reduction of efficiency. Also with the water injected cycle, the heat available from the turbine exhaust still remains to be utilized.

The heat used for generation of steam in a steam injected cycle, is of a much higher quality, i.e., temperature level, than is desirable. For example, typically for a combustion turbine operating at a pressure ratio of 11, the steam pressure required for injection should be at least 200 psia. The corresponding saturation temperature of the steam is 382° F. This requires that a heat source be available at much higher temperatures and heat down to only 420° F. can be utilized without unreasonable temperature pinches.

The inter-cooled regenerative cycle uses inter-cooling during the air-compression step, and compressed air preheated against the turbine exhaust before the air enters the combustor. The optimum pressure ratio for this cycle is about 6 to 7. The heat released in the inter-cooler is all lost to atmosphere. Also the temperature of gas leaving the air pre-heater is around 500° F., and the heat contained in these gases is all wasted. All the thermal diluent is compressed, leading to a large parasitic load, which results in poor overall efficiency for the system.

Martinka U.S. Pat. No. 2,186,706, describes the replacement of a portion of the air for combustion with water vapor derived by directly contacting the compressed air with heated water in a humidification operation. The heat required for this humidification operation is supplied by inter-coolers in the air compressor. Makeup water for the system picks up additional heat from gas turbine exhaust. The net effect of such a system is a reduction in the parasitic load of air compression and, thus, an increase in cycle efficiency.

Nakamura et al., in U.S. Pat. No. 4,537,023, describe a system similar to that of U.S. Pat. No. 2,186,706, in which an after-cooler is used for the air compressor. The after-cooler reduces the temperature of the water leaving the humidifier, which in turn allows recovery of lower-level heat to a greater extent. The decrease in heat-rate resulting from the addition of the after-cooler is approximately 1.4 percent, based on the data presented in the Nakamura et al. patent.

Both the Martinka and the Nakamura et al. systems reject heat from the cycle through the stack gases. Rejection of heat is a consequence of the second law of thermodynamics and any power cycle converting heat to power must reject some heat. To improve the cycle efficiency, it is not only important to minimize the quantity of heat being rejected, but also, to minimize the temperature at which the heat is rejected. In both the Martinka and Nakamura et al. systems, the quality of heat being rejected is solely set by the stack temperature which constrains the cycle efficiency.

SUMMARY OF THE INVENTION

The present invention provides a process for producing mechanical energy or electric power from a fuel, utilizing a combustion turbine in which some or all of the excess air, which is used as thermal diluent and working fluid, is replaced with water vapor to form a gaseous medium. The water vapor is introduced into the system in a very efficient manner, by pumping as a liquid followed by low temperature evaporation. Pumping a liquid requires very little mechanical energy compared to gas (air) compression. Also, evaporation of the water is accomplished using low level heat, in a counter-current multistage humidification operation. Humidifying in multistages permits the temperature of the compressed air to follow closely the temmperatures of the heating medium, which minimizes thermodynamic irreversibilities.

The process of the present invention strives to minimize simultaneously the quantity and quality of heat rejections, and this results in a significant improvement in the cycle thermal efficiency. Low level heat is rejected from the compressed air during inter-cooling and just prior to humidification. The product of quality and quantity of heat rejected in this manner is lower than that rejected through the stack gases. This may be accomplished via air-coolers, cooling water exchangers or through a refrigeration system.

The process of the present invention also reduces the parasitic load of compressing the diluent air and achieves a more thermally efficient power production cycle. Humidification of the compressed air also leads to a reduction of nitrogen oxide emissions, which, of course, is a major environmental benefit. The invention also provides the means for humidifying the compressed air in a thermodynamically efficient manner, using direct contact of the compressed air in a saturator, which permits the air to be humidified with relatively cold water and without the requirement of a steam boiler.

DESCRIPTION OF PREFERRED EMBODIMENTS

Figure 1:
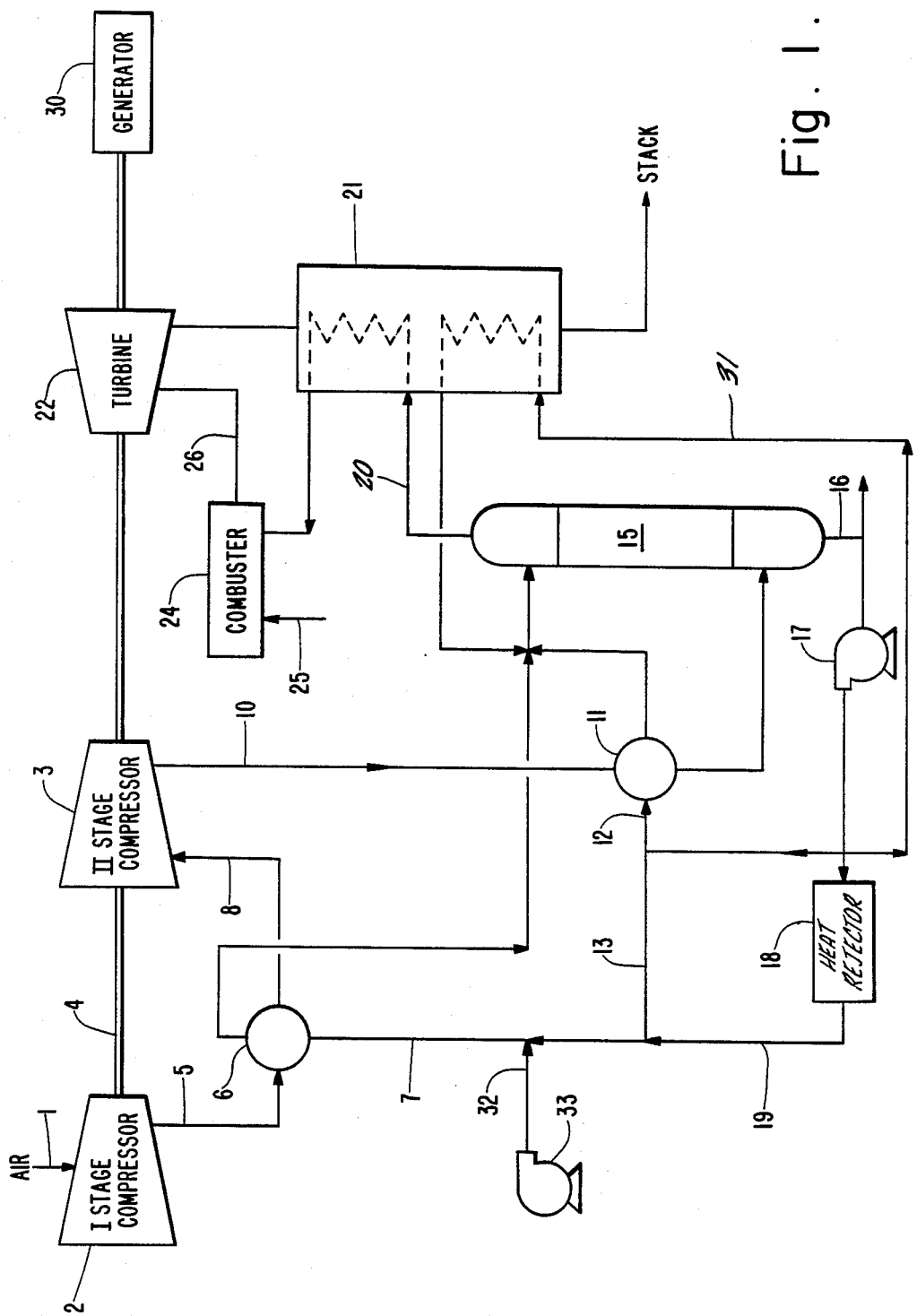
FIG. 1 is a schematic depiction of the process of the present invention in one preferred embodiment utilizing a twostage air compressor, axially coupled to a turbine.

Referring to FIG. 1, air through line 1 is introduced into the first stage of the dual stage air compressor, 2 and 3, which are coupled together axially at 4. The compressed air exiting the first stage of the compressor 2 through line 5 is at a temperature of approximately 300° to 400° F. and passes through heat exchanger 6 where it undergoes heat exchange relationship with water passing through line 7. The temperature of the compressed air is thus reduced to approximately 40;20 to about 250° F., typically about 70° to 140° F., and thereafter is passed through line 8 to the second stage, 3, of the air compressor.

The compressed air exiting the air compressor through line 10 is at a temperature of approximately 300° to about 400° F. and passes through heat exchanger 11 in which it experiences heat exchange with water passing through line 12. The temperature of the compressed air is thus reduced to approximately 40° to about 250° F., typically about 115° to about 200° F.

Water in line 7, following heat exchange in heat exchanger 6, is introduced into the top section of saturator 15, also known as a humidifier at a temperature of about 300° to about 400° F. Within the saturator, the air and water are contacted counter-currently in multi-stages, which improves the thermodynamic efficiency. The operating pressure of the saturator is about 200 psi to about 600 psi, and the water temperature is approximately 300° to about 400° F. The water remaining after vaporization is removed from the bottom of saturator 15 through line 16 and pumped at 17 through exchanger 18 wherein heat is rejected and line 19 to either line 7 and heat exchanger 6 or line 13 and 12 to heat exchanger 11, as desired. Low level heat from the inter-cooler and the after cooler are thus rejected to the atmosphere.

The humidified air exits saturator 15 through line 20 as essentially saturated air at approximately 250° F. to about 350° F. and is passed through heat recovery unit 21 in heat exchange relationship with the exhaust from turbine 22 to preheat the saturated air prior to introduction to combustor 24. The fuel for combustion is introduced through line 25 and the combusted gaseous product exits through line 26 to drive turbine 22. The turbine is coupled axially, at 4, to the air compressor and also to generator 30 for the production of electrical power. While the compressor, turbine and generator are described and illustrated as coupled on a single axle, it will be appreciated that other arrangements may be used, as will be readily understood by those skilled in the art.

Within heat recovery unit 21, the hot exhaust from the gas turbine is passed in heat exchange relationship with water to heat the water to the appropriate temperature for humidification within saturator 15, as illustrated. Thus, water through line 31 may be taken thereby to the heat recovery unit, humidifier 15, as illustrated. Additionally, of course, makeup water may be added through line 32 by pump 33 as is necessary to maintain the necessary water inventory in the system.

Figure 2:
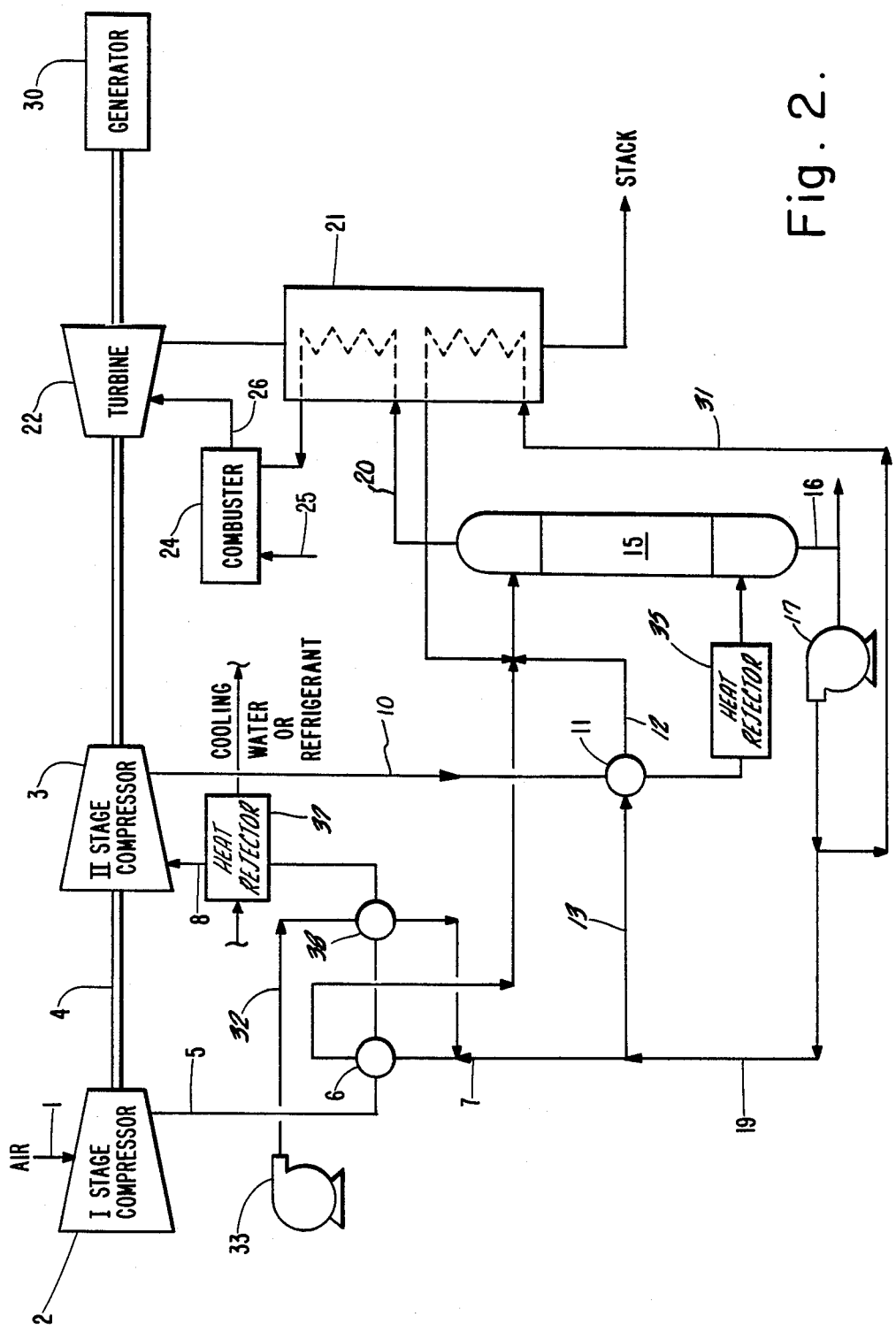
FIG. 2 is a schematic depiction of the process of the present invention, utilizing, variations in the mode of low level heat rejection.

Variations in the mode of low level heat rejection are, of course, possible, and certain of these are depicted in FIG. 2. Thus, in the embodiment here illustrated, heat rejection occurs in exchanger 35, wherein compressed air from the after-cooler 11 undergoes heat exchange against water to increase the temperature of the water, after which the cooled compressed air is introduced into the lower section of saturator 15. Provision may also be made for heat rejection in exchanger 37 in which compressed air from the inter-cooler is heat exchanged against cooling water or refrigerant prior to introduction into stage II of the multiple stage compressor. In this embodiment, makeup water is heated by heat exchange is exchanger 38 before combining with water in line 7 and passage through inter-cooler 6.

Figure 3:
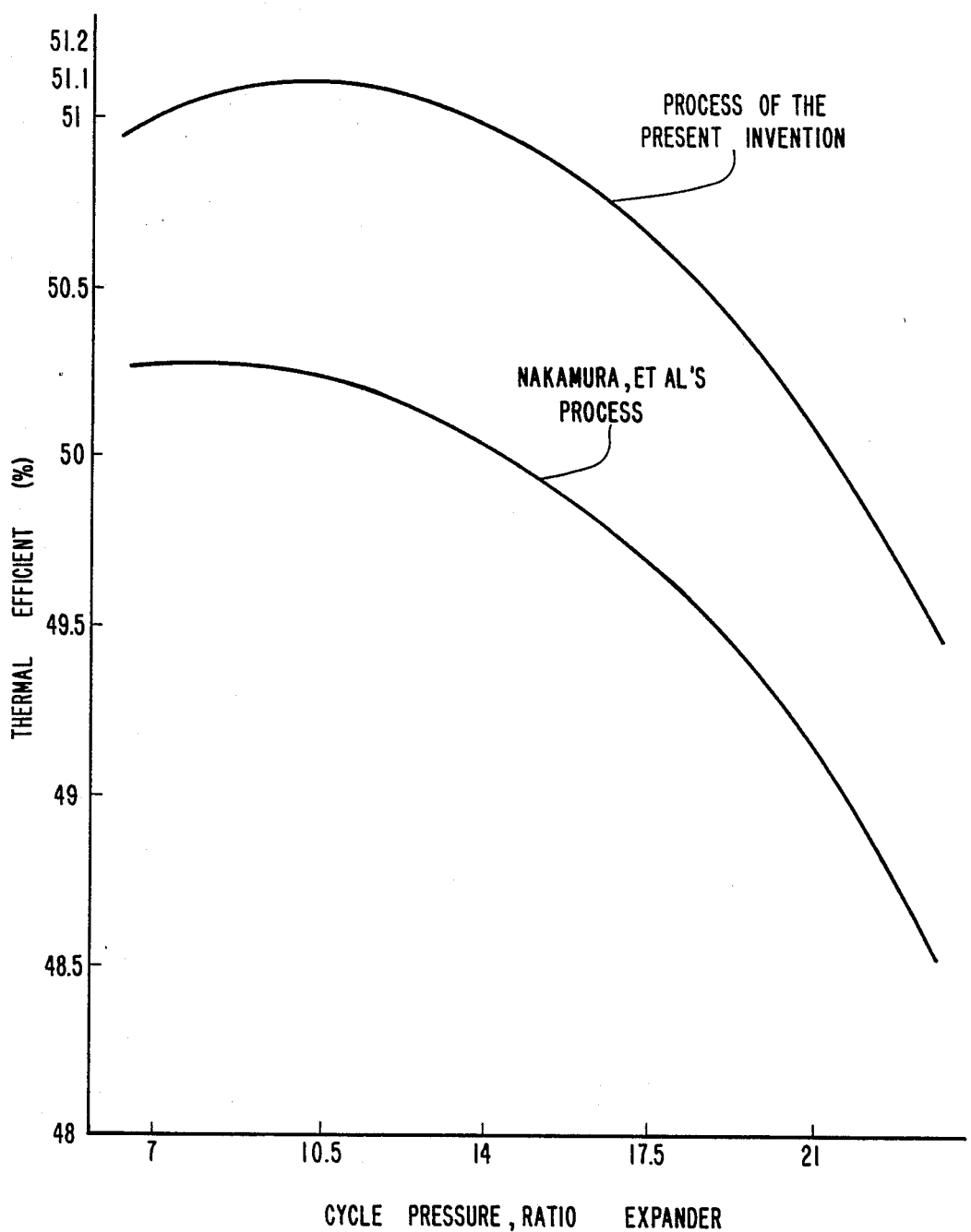
FIGS. 3 and 4 are graphs of the effect of pressure ratio on cycle efficiency and the effect of air temperature to humidifier on cycle efficiency.

The process of this invention is shown as a stand alone power generation cycle. This process may, if desired, be integrated with other process facilitates for further optimization of energy conversion. In a cogeneration configuration, a portion of the hot turbine exhaust would be utilized to produce steam for other purposes. In a reverse manner, the cycle can be integrated with heat recovery in other processes to increase the supply of heated water to the humidification operation. In this manner, the power cycle of the present invention can be used to a greater extent than other cycles in integration with a plant producing large quantities of low temperature level heat such as a coal gasification plant or a geothermal facility, because humidification can be achieved at such low temperatures while the work producing step of expansion in the turbine occurs at much higher pressure ratios. Also, the cycle may be used with reheat turbines more efficiently because this cycle optimizes at higher pressure ratios. In reheat turbines, the first turbine operates at a high pressure where partial expansion occurs, additional fuel is fired in a second combustor, and the hot gases are expanded to near atmospheric pressure in the second turbine. The results of rejecting heat to cooling water are presented in FIG. 3 in the form of a plot of the pressure ratio versus cycle thermal efficiency. For comparison a similar plot for the Nakamura et al. system is also presented in the same Figure. These efficiencies were calculated using a consistent set of design criteria established in the Nakamura et al. patent as follows:

EXAMPLE 1

NAKAMURA PROCESS

| (I) Conditions | |
|---|---|
| (a) Efficiencies | |
| Compressor adiabatic efficiency | $\eta C = 0.89$ |
| Turbine adiabetic efficiency | $\eta T = 0.91$ |
| Mechanical efficiency | $\eta M = 0.99$ |
| Generator efficiency | $\eta G = 0.985$ |
| Combustion efficiency | $\eta B = 0.999$ |
| (b) Ambient air conditions at compressor inlet | |
| Temperature | 15° C. |
| Pressure | 1.033 ata. |
| Relative humidity | 60% |
| Flow rate  dry air | 1 Kg-mole/sec. |
| H$_2$O | 0.0101 Kg-mole/sec. |
| (c) Fuel | |
| Kind | natural gas |
| Temperature | 15° C. |
| High heating value (0° C.) | 245,200 Kcal/Kg-mole |
| Low heating value (0° C.) | 221,600 Kcal/Kg-mole |
| (d) Total pressure loss | 15.2% |
| (e) Replenishing water | |
| Temperature | 15° C. |
| Flow rate | 0.132 Kg-mole/sec. |
| (f) Turbine inlet conditions | |
| Pressure | 6 ata. |
| Temperature | 1,000° C. |
| (g) Minimum temperature difference for heat-exchanger | |

-continued

| | |
|---|---|
| High temperature regenerator $R_1$ | 30° C. |
| Low temperature regenerator $R_2$ | 20° C. |
| Fuel preheater $R_3$ | 30° C. |
| Intercooler IC | 20° C. |

(h) Miscellaneous
The compressive forces of the fuel, replenishing water and water at the bottom of the exchanging tower are assumed to be negligible while the total auxiliary power is taken as 0.3 percent of the generator output. Further, as to the cooling air for the turbine, the availability of low temperature compressed air in the regenerative gas turbine cycle is taken into account to determine its required amount.

(II) Results (a) Waste gas

| | |
|---|---|
| Temperature | 82.7° C. |
| Flow rate | 1.15 Kg-mole/sec. |
| (b) Compressor outlet temperature (AC$_2$) | 148° C. |
| (c) Sending end power output | 8690 KW |
| (d) Sending end thermal efficiency (LHV) | 50.2% |

EXAMPLE 2
RAO PROCESS (I) Conditions (a) Efficiencies

| | |
|---|---|
| Compressor adiabetic efficiency | $\eta C = 0.89$ |
| Turbine adiabatic efficiency | $\eta T = 0.91$ |
| Mechanical efficiency | $\eta M = 0.99$ |
| Generator efficiency | $\eta G = 0.985$ |
| Combustion efficiency | $\eta B = 0.999$ |

(b) Ambient air conditions at compressor inlet

| | |
|---|---|
| Temperature | 15° C. |
| Pressure | 1.033 ata. |
| Relative humidity | 60% |
| Flow rate   dry air | 1 Kg-mole/sec. |
| H$_2$O | 0.0101 Kg-mole/sec. |

(c) Fuel

| | |
|---|---|
| Kind | natural gas |
| Temperature | 15° C. |
| High heating value (0° C.) | 245,200 Kcal/Kg-mole |
| Low heating value (0° C.) | 221,600 Kcal/Kg-mole |
| (d) Total pressure loss | 15.2% |

(e) Replenishing Water

| | |
|---|---|
| Temperature | 15° C. |
| Flow rate | 0.144 Kg-mole/sec. |

(f) Turbine inlet conditions

| | |
|---|---|
| Pressure | 6 ata. |
| Temperature | 1,000° C. |

(g) Minimum temperature difference for heat exchanger and/or exchanger outlet condition

| | |
|---|---|
| High temperature regenerator $R_1$ | 30° C. |
| Low temperature regenerator $R_2$ | 20° C. |
| Fuel Preheater $R_3$ | 30° C. |
| Inter Cooler IC | 20° C. |
| Selfheat exchanger (SR) | 20° C. |
| Intercooler Outlet IC$_2$ | 35° C. |
| Rejecting Aftercooler RAC | 48° C. |

(h) Miscellaneous
The compressive forces of the fuel, replenishing water and water at the bottom of the exchanging tower are assumed to be negligible while the total auxiliary power is taken as 0.3 percent of the generator output. Further, as to the cooling air for the turbine, the availability of low temperature compressed air in the regenerative gas turbine cycle is taken into account to determine its required amount.

(II) Results (a) Waste Gas

| | |
|---|---|
| Temperature | 75.6° C. |
| Flow Rate | 1.18 Kg-mole/sec. |
| (b) Compressor outlet Temperature (AC$_2$) | 157° |
| (c) Sending end power output | 10947KW |
| (d) Sending end thermal efficiency (LHV) | 51.06% |

The Nakamura et al. system shows a peak efficiency at a pressure ratio of approximately 6 for a gas turbine firing temperature of 1832 F. The cycle of the present invention, however, shows a peak efficiency at a pressure ratio of approximately 10.5 for the same gas turbine firing temperature of 1832 F. Comparing the peak performance for the two systems, the heat-rate for the process of the present invention is approximately 1.6 percent lower than that for the Nakamura et al. system. This improvement is actually higher than the improvement by Nakamura et al. from utilizing the after-cooler. Also, the process of the present invention makes it possible to take advantage of higher pressure ratios, for example in the range of 6:1 to 34:1, and thus increases the engine specific power.

Figure 4:
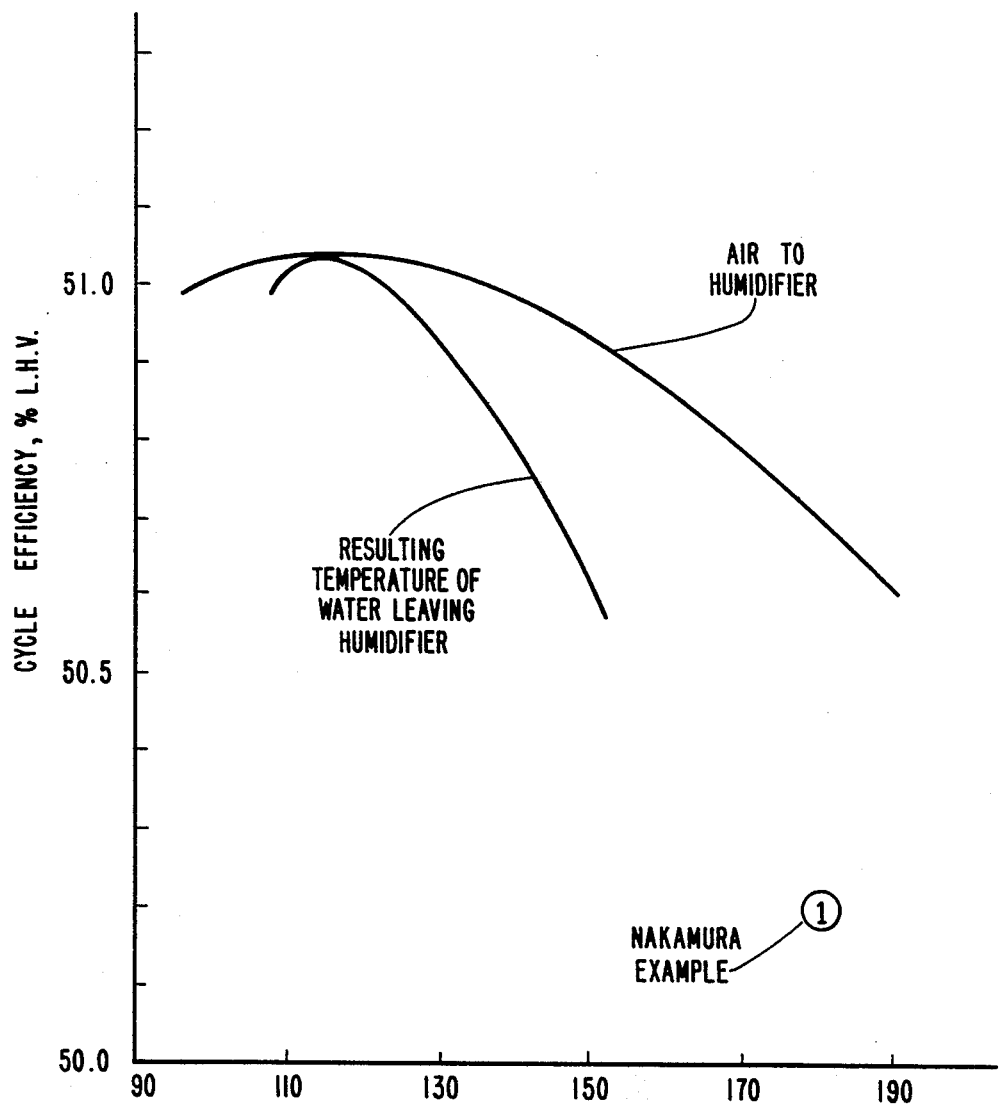

FIG. 4 is a plot of the cycle thermal efficiency drawn as a function of the temperature of the compressed air entering the humidification operation. The upper curve labeled "Air to Humidifier" shows air inlet temperatures with corresponding higher cycle efficiencies resulting from using heat rejection of the present invention in the Nakamura poer cycle. An air inlet temperature and significantly lower cycle efficiency calculated from the example given in the Nakamura '023 patent is also shown in FIG. 4. Also, the lower curve labeled "Resulting Temperatures of Water Leaving Humidifier" shows the temperature of the exit water in the present invention, FIG. 1 at 16, corresponding to the inlet temperature. For example, when the inlet air temperature is about 150 degrees Fahrenheit the corresponding exit water temperature is slightly less than 130 degrees Fahrenheit. This plot shows that the cycle efficiency is not necessarily maximized when the inlet air temperature to the humidifier is minimized. The cycle efficiency drops off as inlet air temperatures, for this example, decreases below approximately 120 degrees Fahrenheit, as shown by the downward sloping of the upper curve as temperature decreases from the point of maximum efficiency. The maximum efficiency is reached when the heat exchange in humidifier 15 is as close as possible to reversible conditions, i.e., when the upper curve is closest to the lower curve. The optimum temperature depends on the simultaneous reduction of quality and quantity of heat rejected.

According to U.S. Pat. No. 4,537,023, precooling of the compressed air for the humidification operation is done to achieve the lowest possible water temperature from the humidifier. This, however, does not result in peak efficiency for the cycle as evidenced by FIG. 4 which shows plots of temperature of air entering the humidifier and the resulting water leaving the humidifier versus cycle efficiency. The peak efficiency occurs when the quality and quantity of heat rejection are simultaneously minimized.

Another disadvantage with the system of U.S. Pat. No. 4,537,023, is that the temperature difference between the air entering the humidifier and water leaving the humidifier is set by the temperature difference used in designing the after-cooler. This forces an added constraint on the system and fixes the temperature of the water leaving the saturator at a higher temperature than the corresponding temperature that results from the process of the present invention.

A major advantage of the process of the present invention is a significant improvement in thermal efficiency. Appreciation for this improvement in thermal efficiency, compared to U.S. Pat. No. 4,537,023 will be realized by the following. In a 500 MW power plant, with the Nakamura et al. process, the fuel required using a gas turbine with a firing temperature of 1832° F.

$$= 500 \text{ MW} \times 100 \frac{KW}{MW} \times 6800 \frac{BTU}{KWH} \times 24 \frac{hrs}{day} \times 365 \frac{day}{yr}$$

$$= 2.98 \times 10^7 \text{ MMBTU/year}$$

With the process of the present invention, the fuel required $$= 500 \times 1000 \text{ MW} \times 6700 \frac{BTU}{KWH} \times 24 \frac{hrs}{day} \times 365 \frac{day}{yr}$$

$$= 2.93 \times 10^7 \text{ MMBTU/year}$$

Hence, fuel savings with the Improved Power Cycle $$= (2.98 \times 10^7 - 2.93 \times 10^7) \text{ MMBTU/year}$$

$$= 0.05 \times 10^7 \text{ MMBTU/year}$$

This corresponds to an annual saving (with fuel cost at $4/MMBTU) of $$0.05 \times 10^7 \frac{\text{MMBTU}}{\text{year}} \times \frac{\$4}{\text{MMBTU}} = \$2 \times 10^6/\text{year}$$

The process of the present invention may also be used to convert low level heat from another plant such as a gasification plant or refinery into mechanical energy or electrical power, at a much higher efficiency than other methods. The fuel used in the combustion engine serves to upgrade the recovered low level heat. Thus, for example, when the low level heat recovered by preheating the humidifier circulating water, in the range of 300° to 140° F. from a gasification plant is converted to electric power, the effective efficiency of conversion is as high as approximately 18%. The imported heat may be used to evaporate additional water to provide total water in the range of 0.26 to 0.5 pounds per pound of dry air.

The standard of efficiency of conversion of such low level heat may be calculated for U.S. Pat. No. 4,085,591, "Continuous Flow, Evaporative-Type Thermal Energy Recovery Apparatus and Method for Energy Recovery", where a pressurized gas, e.g. air, is humidified in a spray chamber, and expanded through a gas turbine, to take advantage of the higher specific volume of humidified air. The resulting efficiency with this system is less than 5%. Also there are a number of inherent disadvantages. To produce appreciable amounts of power, very large equipment is required since the system pressure is limiting. This system cannot "upgrade" the recovered low level energy, since it cannot be used in conjunction with a combustion engine.

It will be appreciated from the foregoing description that, with the process of the present invention, chemical energy, or low level heat supplemented with chemical energy, may be converted to mechanical energy or electrical power at a very high efficiency. It will also be appreciated that significant environmental benefits will result from the process of the present invention, including conservation of energy resources and reduction in thermal pollution due to the higher efficiency, a reduction in water consumption, particularly as compared to either the combined cycle or the steam injected cycle, and a reduction in nitrogen oxide emissions. With combined cycle plants, steam must be injected into the combustor to reduce such emissions, which in turn leads to a decrease in efficiency, which is overcome by the present invention.

In light of the foregoing description, certain variations and modifications of the process of the present invention may become apparent to those skilled in the art. Thus, for example, a plurality of inter-coolers may be used as well as more than two stages of air compression. Also, the inlet air to the compressor may be cooled using a refrigeration system to improve both the efficiency and capacity of the system. The air leaving the inter-cooler may also be further cooled using the refrigeration system and the saturator water may also be precooled, using a refrigeration system, before it enters the inter-cooler. Additionally, saturators of designs other than that illustrated may be used, such as a design where the water would be introduced at a plurality of locations. It is accordingly to be understood that all such modifications and variations are to be considered within the scope of the present invention.

What is claimed is:

1. A process for producing power utilizing a combustion gas turbine, comprising:
    (a) compressing air to a predetermined pressure;
    (b) the said compression step being performed with inter-stage cooling against circulating water thereby heating the water, and using the resulting heated water to humidify the compressed air;
    (c) contacting the compressed air with the resulting heated water in a multistage counter-current operation for the humidification operation to form a gaseous medium;
    (d) burning fuel in the presence of the gaseous medium;
    (e) driving a gas turbine for production of power; and
    (f) rejecting heat from the process via the circulating water prior to its use for inter-stage cooling.

2. A process for producing power utilizing a combustion gas turbine, comprising:
    (a) compressing air to a predetermined pressure;
    (b) the said compression step being performed with aftercooling against circulating water thereby heating the water, and using the resulting heated water to humidify the compressed air;
    (c) contacting the compressed air with the resulting heated water in a multistage counter-current operation for the humidification operation to form a gaseous medium;
    (d) burning fuel in the presence of the gaseous medium;
    (e) driving a gas turbine for production of power; and
    (f) rejecting heat from the process via the circulating water prior to its use for aftercooling.

3. A gas combustion process for producing power using a countercurrent humidifier to humidify compressed air that is combusted with fuel including compressing the air, cooling the compressed air with water to thereby heat the water, using the water heated by the cooling of the compressed air to humidify the compressed air, the improvement comprising:

the step of rejecting heat contained in the water heated by the cooling of the compressed air which includes rejection of heat from the process prior to humidification.

4. A process for producing power in a gas turbine power system comprising the steps of:

compressing air in a first air compressor;

removing heat of compression from the air compressed in the first air compressor by collecting the removed heat in a circulating water system;

further compressing the air in a second air compressor;

removing heat of compression from the air compressed in the second air compressor by further collecting the removed heat in the circulating water system;

removing heat from the process by rejecting heat from the circulating water system to precool the air;

moisturizing the precooled air by feeding the precooled air and water from the circulating system into a countercurrent two phase humidifier to produce a gaseous medium;

feeding the gaseous medium and fuel into a combustion chamber to produce combustion gases;

feeding the combustion gases to a gas turbine to convert thermal energy to mechanical work;

coupling the gas turbine to a generator for converting mechanical work to electric power; and coupling the gas turbine to the first and second air compressors for compressing air.

5. A process for producing power utilizing a combustion turbine, comprising humidifying compressed air in multistage countercurrent flow prior to combustion, to provide a gaseous medium as thermal diluent for combustion in said turbine, said water being at a temperature below its boiling point at the operating pressure when in contact with said compressed air, passing said compressed air in heat exchange relationship with water prior to humidification, whereby the temperature of said water is increased and the temperature of said compressed air decreased, and rejecting heat from the power production process by precooling said compressed air prior to humidification.

6. A process for producing power utilizing a combustion gas turbine, comprising:

(a) compressing air to a predetermined pressure;

(b) aftercooling the compressed air against water, whereby the temperature of said water is increased and the temperature of said compressed air is decreased;

(c) contacting said compressed air with said heated water in a multistage countercurrent operation to humidify said compressed air and provide a gaseous medium as thermal diluent for combustion in said turbine;

(d) said step of contacting the compressed air with heated water being preceded by heat rejection from the process by rejecting heat from the air.

7. A process for producing power utilizing a combustion gas turbine, comprising:

(a) compressing air to a predetermined pressure;

(b) the said compression step being performed with interstage cooling against water and using the resulting heated water to humidify the compressed air;

(c) contacting the compressed air with the resulting heated water in a multistage countercurrent operation for the humidification operation to form a gaseous medium;

(d) said step of interstage cooling during the compression step including rejecting heat from the process.

8. The processes of claims 4, 6, 7, 1 or 2 in which the gaseous medium is preheated against the gas turbine exhaust and then mixed with the fuel for combustion.

9. The process of claims 4, 6, 7, 1 or 2 in which water heated in the gas turbine exhaust is used in the humidification operation.

10. The processes of claims 3, 4, 6, 7, 1 or 2 in which water heated by sources external to the process is used in the humidification operation.

11. The process of claims 3, 4, 5, 6, 7, 1 or 2 and in which the overall compression ratio is between 6:1 and 34:1.

12. The process of claim 3, 4, 5, 6, 7, 1 or 2 in which the water vapor content of the gaseous medium is between 0.26 and 0.5 pounds per pound of dry air.

13. The process of claims 3, 4, 1 or 2 in which the fuel is pretreated by the gas turbine exhaust.

14. The process of claims 3, 4, 5, 6, 7, 1 or 2 in which a fuel gas is humidified using water heated in the intercooler, after cooler and gas turbine exhaust.

15. A gas combustion process for producing power including the steps of compressing air and removing at least some heat of compression from the compressed air by cooling the compressed air against circulating water to thereby heat the circulating water, of using the resulting heated water to humidify the compressed air, of establishing in a combustion chamber a mixture of the humidified compressed air and fuel and burning the fuel in the mixture in the combustion chamber, the improvement comprising the step of rejecting from the process heat contained in the compressed air used in the process wherein the heat is rejected from the process prior to humidification.

16. A process for producing power in a gas turbine power system comprising the steps of compressing air in a first air compressor;

removing heat of compression from the air compressed in the first air compressor by collecting the removed heat in a circulating water system;

further compressing the air in a second air compressor;

removing heat of compression from the air compressed in the second air compressor by further collecting the removed heat in the circulating water system;

removing further heat from the air compressed in the second air compressor by rejecting heat from the process to precool the air;

moisturizing the precooled air by feeding the precooled air and water from the circulating system containing the removed heat from the first and second air compressions into a countercurrent two phase humidifier to produce water vapor;

feeding the water vapor and fuel into a combustion chamber to produce hot combustion gases;

feeding the hot combustion gases to a gas turbine to convert thermal energy to mechanical work;

coupling the gas turbine to a generator for converting mechanical work into electric power; and coupling the gas turbine to the first and second air compressors for compressing air.

17. A process for producing mechanical power utilizing heat contained in process fluids within the system and heat from combusting a combustible fuel in a combustion chamber to turn a gas turbine comprising:

providing combustible fuel;

providing process fluids consisting of compressed air and water;

providing a circulating water system which contains the water;

providing a humidifier capable of creating a gaseous medium including water vapor;

producing the gaseous medium by feeding the compressed air to the humidifier and circulating the water through the humidifier;

cooling the compressed air by rejecting from the process some heat from at least one of the process fluids prior to producing the gaseous medium;

feeding the gaseous medium and the combustible fuel to the combustion chamber;

combusting the fuel in the presence of the gaseous medium within the combustion chamber to provide a working fluid at a first elevated temperature;

feeding the working fluid to the gas turbine;

expanding the working fluid in the gas turbine to produce mechanical power and turbine exhaust;

extracting heat from the turbine exhaust for use within the process thereby producing a cooled turbine exhaust; and rejecting the cooled turbine exhaust from the process.

* * * * *